(12) United States Patent
Kim

(10) Patent No.: US 12,307,999 B2
(45) Date of Patent: May 20, 2025

(54) DISPLAY APPARATUS COMPRISING A PLURALITY OF DRIVER IC, MODULAR DISPLAY APPARATUS AND CONTROL METHOD THEREOF

(71) Applicant: SAMSUNG ELECTRONICS CO., LTD., Suwon-si (KR)

(72) Inventor: Sangwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/534,201

(22) Filed: Dec. 8, 2023

(65) Prior Publication Data
US 2024/0153468 A1    May 9, 2024

Related U.S. Application Data

(63) Continuation of application No. PCT/KR2023/017667, filed on Nov. 6, 2023.

(30) Foreign Application Priority Data

Nov. 9, 2022  (KR) .................. 10-2022-0148953

(51) Int. Cl.
G09G 5/00    (2006.01)
G06F 3/14    (2006.01)

(52) U.S. Cl.
CPC ........... *G09G 5/003* (2013.01); *G06F 3/1446* (2013.01); *G09G 2300/026* (2013.01); *G09G 2370/08* (2013.01)

(58) Field of Classification Search
None
See application file for complete search history.

(56) References Cited

U.S. PATENT DOCUMENTS 5,164,853 A  * 11/1992 Shimazaki .......... G02F 1/13336
                                                                   349/149
8,179,336 B2    5/2012 Hamer et al.
(Continued)

FOREIGN PATENT DOCUMENTS

CN    107181968 A    9/2017
JP    2012-230168 A   11/2012
(Continued)

OTHER PUBLICATIONS

International Search Report (PCT/ISA/210) issued on Feb. 19, 2024 by the International Searching Authority in International Patent Application No. PCT/KR2023/017667.
(Continued)

*Primary Examiner* — Kirk W Hermann
(74) *Attorney, Agent, or Firm* — Sughrue Mion, PLLC

(57) ABSTRACT

A display apparatus of a modular display apparatus including a plurality of display apparatuses includes a communication interface, and a plurality of driver integrated circuits (ICs), where a first driver IC among the plurality of driver ICs is configured to, based on receiving a first signal transmitted by an external device through the communication interface, transmit the first signal to a second driver IC adjacent to the first driver IC such that the first signal is sequentially transmitted to remaining driver ICs among the plurality of driver ICs that are connected in a daisy chain manner, and each of the first driver IC and the second driver IC is configured to transmit a second signal, that is transmitted by the external device, to a first other display apparatus among the plurality of display apparatuses that is connected to the display apparatus.

20 Claims, 9 Drawing Sheets

(56) References Cited

U.S. PATENT DOCUMENTS

| | | | |
|---|---|---|---|
| 8,508,431 | B2 | 8/2013 | Kim et al. |
| 9,582,237 | B2 | 2/2017 | Hall |
| 10,735,029 | B2 | 8/2020 | Shi et al. |
| 11,074,852 | B2 | 7/2021 | Hyeon |
| 11,269,578 | B2 | 3/2022 | Kim |
| 11,455,946 | B2 | 9/2022 | Hyeon |
| 2005/0178034 | A1* | 8/2005 | Schubert .............. G09F 9/33 40/605 |
| 2009/0015513 | A1* | 1/2009 | Kim ................. G06F 3/1446 345/1.3 |
| 2013/0167188 | A1* | 6/2013 | Lee ................ H04N 21/4854 725/127 |
| 2020/0004492 | A1 | 1/2020 | Kim |
| 2020/0082752 | A1* | 3/2020 | Hyeon ................ G09G 3/32 |
| 2021/0011820 | A1* | 1/2021 | Kim ................. G06F 3/1446 |
| 2021/0225270 | A1 | 7/2021 | Hyeon |
| 2022/0188059 | A1 | 6/2022 | Kim |
| 2023/0215345 | A1* | 7/2023 | Kim .................. G09G 5/12 345/55 |

FOREIGN PATENT DOCUMENTS

| | | | |
|---|---|---|---|
| KR | 10-2009-0005828 A | | 1/2009 |
| KR | 10-2011-0028527 A | | 3/2011 |
| KR | 101201294 B1 | * | 11/2012 |
| KR | 20-0468004 Y1 | | 7/2013 |
| KR | 101511110 B1 | * | 4/2015 |
| KR | 10-1644757 B1 | | 8/2016 |
| KR | 10-2058081 B1 | | 12/2019 |
| KR | 10-2020-0003599 A | | 1/2020 |
| KR | 10-2020-0028142 A | | 3/2020 |
| KR | 10-2021-0154693 A | | 12/2021 |

OTHER PUBLICATIONS

Written Opinion (PCT/ISA/237) issued on Feb. 19, 2024 by the International Searching Authority in International Patent Application No. PCT/KR2023/017667.

* cited by examiner

| 300 | 600 | 900 | 1200 |
| 200 | 500 | 800 | 1100 |
| 100 | 400 | 700 | 1000 |

DISPLAY APPARATUS COMPRISING A PLURALITY OF DRIVER IC, MODULAR DISPLAY APPARATUS AND CONTROL METHOD THEREOF

CROSS-REFERENCE TO RELATED APPLICATION(S)

This application is a bypass continuation of International Application No. PCT/KR2023/017667, filed on Nov. 6, 2023, in the Korean Intellectual Property Receiving Office, which is based on and claims priority to Korean Patent Application No. 10-2022-0148953, filed on Nov. 9, 2022, in the Korean Intellectual Property Office, the disclosures of which are incorporated by reference herein in their entireties.

BACKGROUND

1. Field

The disclosure relates to a display apparatus, a modular display apparatus, and a control method thereof and, more specifically, to a display apparatus including a plurality of driver integrated circuits (ICs), a modular display apparatus including a display apparatus including a plurality of display apparatuses connected in a daisy chain manner, and a control method thereof.

2. Description of Related Art

Recently, a display system of various formats has been developed and distributed.

In particular, in accordance with a display system getting larger and having a higher resolution, the number of display modules and display apparatuses constituting a display system is increasing in proportion thereto.

In a modular display apparatus, the size and shape of the modular display apparatus may vary according to the number and size, or the like, of the display apparatuses constituting the modular display apparatus.

In a plurality of display apparatuses connected in a daisy chain manner, when a connection is disconnected or an error occurs during the transmission of a signal, there may be a problem in that a plurality of consecutively connected display apparatuses may not receive a signal.

Thus, when the transmission of a driving signal fails such as a case where a signal is disconnected in a section among a plurality of display apparatuses, there is a need of a method of allowing remaining display apparatuses connected after the section where a signal is disconnected to receive a driving signal.

SUMMARY

Provided is a system, method, and device for allowing remaining display apparatuses, among a plurality of display apparatuses that are positioned after a section where a signal is disconnected, to receive a driving signal.

Additional aspects will be set forth in part in the description which follows and, in part, will be apparent from the description, or may be learned by practice of the presented embodiments.

According to an aspect of the disclosure, a display apparatus of a modular display apparatus including a plurality of display apparatuses may include a communication interface, and a plurality of driver integrated circuits (ICs), where a first driver IC among the plurality of driver ICs may be configured to, based on receiving a first signal transmitted by an external device through the communication interface, transmit the first signal to a second driver IC adjacent to the first driver IC such that the first signal is sequentially transmitted to remaining driver ICs among the plurality of driver ICs that are connected in a daisy chain manner, and each of the first driver IC and the second driver IC may be configured to transmit a second signal, that is transmitted by the external device, to a first other display apparatus among the plurality of display apparatuses that is connected to the display apparatus.

The first signal may include a first driving signal corresponding to the display apparatus and the second signal may include a second driving signal corresponding to the first other display apparatus.

The first driver IC may be configured to, based on receiving the second signal through the communication interface, transmit the second signal to the second driver and the second driver IC may be configured to, based on receiving the second signal from the first driver IC, transmit the second signal to the first other display apparatus.

The communication interface may include a repeater configured to receive the second signal transmitted by the external device and transmit the second signal to each of the first driver IC and the second driver IC.

The second driver IC may be further configured to, based on receiving the second signal through the repeater of the communication interface, transmit the second signal to the first other display apparatus.

The external device may include a control box or a second other display apparatus among the plurality of display apparatuses that is connected to the display apparatus.

The communication interface may include a switch and the switch may be configured to, based on the external device being the second other display apparatus, identify whether the first signal is received from each of a third driver IC and a fourth driver IC of the second other display apparatus.

The switch may be further configured to, based on receiving the first signal from the third driver IC of the second other display apparatus, transmit the first signal to the first driver IC of the display apparatus and based on not receiving the first signal from the third driver IC of the second other display apparatus, transmit the first signal received from the fourth driver IC of the second other display apparatus to the first driver IC of the display apparatus.

The display apparatus and the first other display apparatus may be connected in a daisy chain manner and the first other display apparatus may be adjacent to the display apparatus.

According to an aspect of the disclosure, a method of controlling a display apparatus of a modular display apparatus comprising a plurality of display apparatuses, where the display apparatus including a plurality of driver integrated circuits (ICs), may include, based on receiving a first signal transmitted by an external device, transmitting the first signal to a second driver IC among the plurality of driver ICs that is adjacent to a first driver IC among the plurality of driver ICs, such that the first signal is sequentially transmitted to remaining driver ICs of the plurality of driver ICs that are connected in a daisy chain manner and transmitting, by each of the first driver IC and the second driver IC, a second signal, that is transmitted by the external device, to a first other display apparatus among the plurality of display apparatuses that is connected to the display apparatus.

The first signal may include a first driving signal corresponding to the display apparatus, and the second signal may include a second driving signal corresponding to the first other display apparatus.

The transmitting the second signal to the first other display apparatus may include transmitting, by the first driver IC, the second signal to the second driver IC, and transmitting, by the second driver IC, the second signal to the first other display apparatus.

The transmitting the second signal to the first other display apparatus may include receiving, by a repeater, the second signal that is transmitted by the external device and transmitting the second signal to each of the first driver IC and the second driver IC.

The transmitting the second signal to the first other display apparatus may include, based on receiving the second signal through the repeater, transmitting, by the second driver IC, the second signal to the first other display apparatus.

The external device may include a control box or a second other display apparatuses among the plurality of display apparatuses that is connected to the display apparatus.

According to an aspect of the disclosure, a non-transitory computer-readable storage medium may store instructions that, when executed by at least one processor, cause the at least one processor to, in a display apparatus of a modular display apparatus including a plurality of display apparatuses, based on receiving a first signal transmitted by an external device, transmitting the first signal to a second driver IC among a plurality of driver ICs that is adjacent to a first driver IC among the plurality of driver ICs, such that the first signal is sequentially transmitted to remaining driver ICs of the plurality of driver ICs that are connected in a daisy chain manner, and transmitting, by each of the first driver IC and the second driver IC, a second signal, that is transmitted by the external device, to a first other display apparatus among the plurality of display apparatuses that is connected to the display apparatus.

The first signal may include a driving signal corresponding to the display apparatus and the second signal may include a driving signal corresponding to the first other display apparatus.

The instructions, when executed, may further cause the at least one processor to transmit, by the first driver IC, the second signal to the second driver IC and transmit, by the second driver IC, the second signal to the first other display apparatus.

The instructions, when executed, may further cause the at least one processor to receive, by a repeater, the second signal that is transmitted by the external device and transmit the second signal to each of the first driver IC and the second driver IC.

The instructions, when executed, may further cause the at least one processor to, based on receiving the second signal through the repeater, transmit, by the second driver IC, the second signal to the first other display apparatus.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a diagram illustrating a modular display apparatus in which a plurality of display apparatuses are combined according to one or more embodiments of the disclosure;

DETAILED DESCRIPTION

Figure 1:
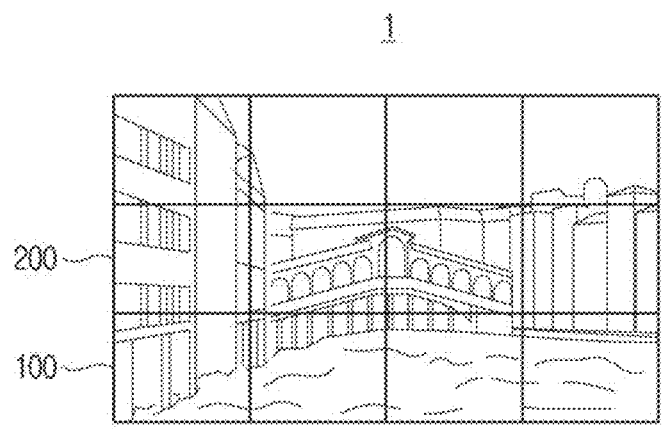
FIG. 1 is a diagram illustrating a modular display apparatus displaying an image according to one or more embodiments of the disclosure.

Terms used in the disclosure will be briefly described, and then the one or more embodiments will be described in detail.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure.

Terms such as "first," "second," and the like may be used to describe various components, but the components should not be limited by the terms. The terms are used to distinguish a component from another.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

The term such as "module," "unit," "part," and so on in the disclosure may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module and may be realized in at least one processor (not shown).

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

FIG. 1 is a diagram illustrating a modular display apparatus displaying an image according to one or more embodiments of the disclosure.

A modular display apparatus 1 according to an embodiment of the disclosure may include a plurality of display apparatuses, such as display apparatus 100, display apparatus 200, etc.

For example, referring to FIG. 1, a modular display apparatus 1 according to an embodiment of the disclosure includes a plurality of display apparatuses 100, 200, etc., and each of a plurality of display apparatuses 100, 200, etc., may be configured as one display apparatus (i.e., a modular display apparatus 1) through connection in a daisy chain manner.

FIG. 2 is a diagram illustrating a modular display apparatus in which a plurality of display apparatuses are combined according to one or more embodiments of the disclosure.

Referring to FIG. 2, the modular display apparatus 1 may include a plurality of display apparatuses (or a plurality of display modules) 100, 200, . . . , 1200 and the modular display apparatus 1 may display an image (or a video) using a plurality of display apparatuses 100, 200, . . . , 1200.

For example, the modular display apparatus 1 may include a plurality of display apparatuses 100, 200, . . . , 1200 arranged in a matrix form (e.g., in a 4×3 format). The 4×3 format is merely an example for convenience of description, and an arrangement format, the number, or the like, of a plurality of display apparatuses 100, 200, . . . , 1200 may be variously changed (for example, resolution, size, etc.) based on parameters of the modular display apparatus 1, the manufacturing purpose of the manufacturer, and the like.

According to an embodiment, the modular display apparatus 1 may be implemented as a television (TV), but the embodiment is not limited thereto, and any device having a display function such as a video wall, a large format display (LFD), a digital signage (digital sign), a digital information display (DID), a projector display, and the like, is applicable.

In addition, the modular display apparatus 1 may be implemented with various types of displays like a liquid crystal display (LCD), organic light-emitting diode (OLED), liquid crystal on silicon (LCoS), digital light processing (DLP), quantum dot (QD) display panel, quantum dot light-emitting diodes (QLED), or the like.

A plurality of display apparatuses 100, 200, . . . , 1200 according to an embodiment of the disclosure may include a plurality of self-emitting elements. Here, the self-emitting element may be at least one of a light emitting diode (LED) or a micro LED. The micro LED is a ultra-small LED having a size of about 5-100 micrometers and emits light by itself without a color filter.

At least one display apparatus (e.g., first display apparatus 100) among a plurality of display apparatuses 100, 200, . . . , 1200 constituting the modular display apparatus 1 according to an embodiment may be connected to the external device (e.g., source device, timing controller (TCON), etc.), and may receive a control signal, a driving signal, or the like, from the external device.

According to an embodiment, a plurality of display apparatuses 100, 200, . . . , 1200 may be connected according to a daisy chain manner. For example, the first display apparatus 100 may be connected to the second display apparatus 200, and the second display apparatus 200 may be connected to the third display apparatus 300. That is, a plurality of display apparatuses 100, 200, . . . , 1200 may be consecutively connected. In this case, the first display apparatus 100 connected to an external device may transmit a control signal, a driving signal, etc., received from an external device to the second display apparatus 200 connected to the first display apparatus 100, and may consecutively transmit the signal to remaining display apparatuses 200, 300, . . . , 1200 connected according to the daisy chain manner.

Also, a plurality of display apparatuses 100, 200, . . . , 1200 may be divided into a plurality of groups, and display apparatuses included in each of the plurality of groups may be connected according to a daisy chain manner. For example, as shown in FIG. 2, when the plurality of display apparatuses 100, 200, . . . , 1200 are arranged in a 4×3 format, a plurality of display apparatuses 100, 200, . . . , 1200 may be divided into first to fourth groups according to a column. The embodiment is not limited thereto, and a plurality of display apparatuses 100, 200, . . . , 1200 may be divided into the first to third groups according to a row.

At least one display apparatus (for example, the lowest display apparatus or the leftmost display apparatus) of the display apparatuses included in each group may be connected to an external device (e.g., a source device, a TCON, etc.) and may receive a control signal, a driving signal, and the like, from an external device.

For example, the first display apparatus 100 to the third display apparatus 300 may be one group, the first display apparatus 100 may be connected to the second display apparatus 200, and the second display apparatus 200 may be connected to the third display apparatus 300. In this case, the first display apparatus 100 connected to the external device may sequentially transmit a control signal, a driving signal, and the like received from the external device to the second display apparatus 200 and the third display apparatus 300 included in the same group with the first display apparatus 100.

Also, the fourth display apparatus 400 to the sixth display apparatus 600 may be one group, the fourth display apparatus 400 may be connected to the fifth display apparatus 500, and the fifth display apparatus 500 may be connected to the sixth display apparatus 600. In this case, the fourth display apparatus 400 connected to an external device may sequentially transmit a control signal, a driving signal, etc. received from an external device to the fifth display apparatus 500 and the sixth display apparatus 600 included in the same group with the fourth display apparatus 400.

As another example, each of a plurality of display apparatuses 100, 200, . . . , 1200 included in the modular display apparatus 1 may be serially connected to each other, and at least one display apparatus that receives a control signal, a driving signal from an external device may transmit, to another display apparatus serially connected, the received control signal, driving signal, or the like, and accordingly, a control signal, a driving signal, or the like, may be sequentially transmitted to all the plurality of display apparatuses 100, 200, . . . , 1200

For example, as resolution, size, etc., of the modular display apparatus 1 increases, the number of a plurality of display apparatuses 100, 200, . . . , 1200. provided in the modular display apparatus 1 increases proportionally, and the connection relationship (for example, a connection relationship for each of a plurality of display apparatuses 100, 200, . . . , 1200 to receive a control signal, a driving signal, etc. from an external device), etc., may be diversely modified in addition to a related-art standardized communication connection relationship.

In the disclosure, for convenience of description, a plurality of display apparatuses 100, 200, . . . , 1200 included in the modular display apparatus 1 are divided into a plurality of groups, and display apparatuses included in each of the plurality of groups are connected according to a daisy chain manner.

Figure 3:
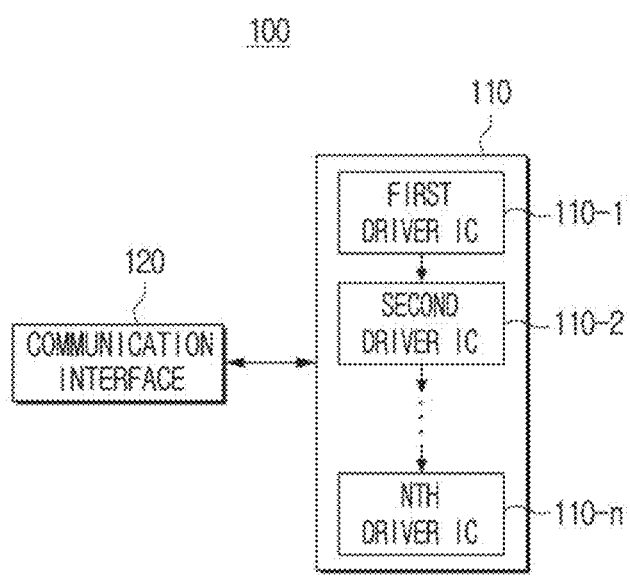
FIG. 3 is a block diagram illustrating a display apparatus according to one or more embodiments of the disclosure.

FIG. 3 is a block diagram illustrating a display apparatus according to one or more embodiments of the disclosure.

Hereinafter, for convenience of description, one of a plurality of display apparatuses 100, 200, . . . , 1200 is assumed to be the first display apparatus 100, but various embodiments of the disclosure may be implemented in each of a plurality of display apparatuses 100, 200, . . . , 1200

The display apparatus 100 according to an example includes a plurality of driver ICs 110, including a first driver IC 110-1, a second driver IC 110-2, an nth driver IC 110-n, etc., and the communication interface 120.

The communication interface 120 according to an embodiment receives various signals and data. For example, the communication interface 120 may communicate with an external device through various wired/wireless communication methods using an application processor (AP)-based wireless local area network (LAN) (WLAN) (e.g., Wi-Fi), Bluetooth, Zigbee, wired/wireless LAN, wide area network (WAN), Ethernet, IEEE1394, high definition multimedia interface (HDMI), universal serial bus (USB), mobile high-definition link (MHL), audio engineering society/European broadcasting union (AES/EBU), optical, coaxial, radio frequency (RF) like near field communication (NFC), infrared (IR) and the like, and may communicate with another display device (for example, a second display device 200 connected to a first display apparatus 100). For example, the communication interface may be implemented as a wired communication interface, for example, a V-by-One, an HDMI cable, a low voltage differential signals (LVDS) cable, a digital visual interface (DVI) cable, a D-subminiature (D-SUB) cable, a video graphics array (VGA) cable, an optical cable, and the like.

According to an example, the communication interface 120 may receive a signal transmitted by an external device. The external device may include an electronic device (e.g., source device, etc.) and a TCON (e.g., the TCON 2 of FIGS. 6-8) provided in the control box of the modular display apparatus 1.

For example, a TCON provided in a control box of the modular display apparatus 1 may receive a video signal from an electronic device and generate a driving signal for driving the display apparatus 100 based on the video signal.

For example, when the video signal is received, the TCON may determine an area corresponding to the identification information of the first display apparatus 100 among the entire area of the image corresponding to the video signal. The identification information of the first display apparatus 100 may be pre-stored in the first display apparatus 100. For example, when the identification information of the first display apparatus 100 is ID 1, the TCON provided in the control box of the modular display apparatus 1 may determine an area corresponding to ID 1 among the entire area of the image.

The TCON may generate a driving signal for driving a plurality of pixels included in the first display apparatus 100 in order to display an image corresponding to the determined area through the first display apparatus 100. Subsequently, the TCON may transmit the driving signal to the first display apparatus 100, and the communication interface 120 provided in the first display apparatus 100 may receive the driving signal.

A first driver IC 110-1 connected to the communication interface 120 among a plurality of driver ICs 110 provided in the first display apparatus 100 may receive a driving signal, and may control pixels corresponding to the first driver IC 110-1 among a plurality of pixels included in the first display apparatus 100 based on the driving signal.

A plurality of driver ICs 110 included in the first display apparatus 100 may be connected by a daisy chain manner and the first driver IC 110-1 may transmit a driving signal consecutively to remaining driver ICs 110-1, . . . , 110-n connected according to the daisy chain manner.

A plurality of display apparatuses 100, 200, . . . , 1200 are connected in a daisy chain manner, the TCON provided in a control box of the modular display apparatus 1 according to an embodiment of the disclosure may transmit a driving signal corresponding to the remaining display apparatuses (that is, display apparatuses connected to the first display apparatus 100 in a daisy chain manner) to the first display apparatus 100.

For example, a plurality of display apparatuses 100, 200, . . . , 1200 included in the modular display apparatus 1 may be divided into a plurality of groups, and when the display apparatuses included in each of the plurality of groups are connected according to a daisy chain manner, the TCON provided in the control box of the modular display apparatus 1 may transmit a driving signal corresponding to the first display apparatus 100, a driving signal corresponding to the second display apparatus 200, and a driving signal corresponding to the third display apparatus 300 to the first display apparatus 100 included in the first group (including the first to third display apparatuses 100, 200, 300).

The first display apparatus 100 may control a plurality of pixels included in the first display apparatus 100 by transmitting a driving signal corresponding to the first display apparatus 100 to each of a plurality of driver IC 110 included in the first display apparatus 100 (for example, sequentially transmitting the driving signal to the plurality of driver IC 110 according to a daisy chain manner).

The first display apparatus 100 may transmit a driving signal corresponding to the second display apparatus 200 and a driving signal corresponding to the third display apparatus 300 to the second display apparatus 200 connected to the first display apparatus 100 by a daisy chain manner.

Figure 4:
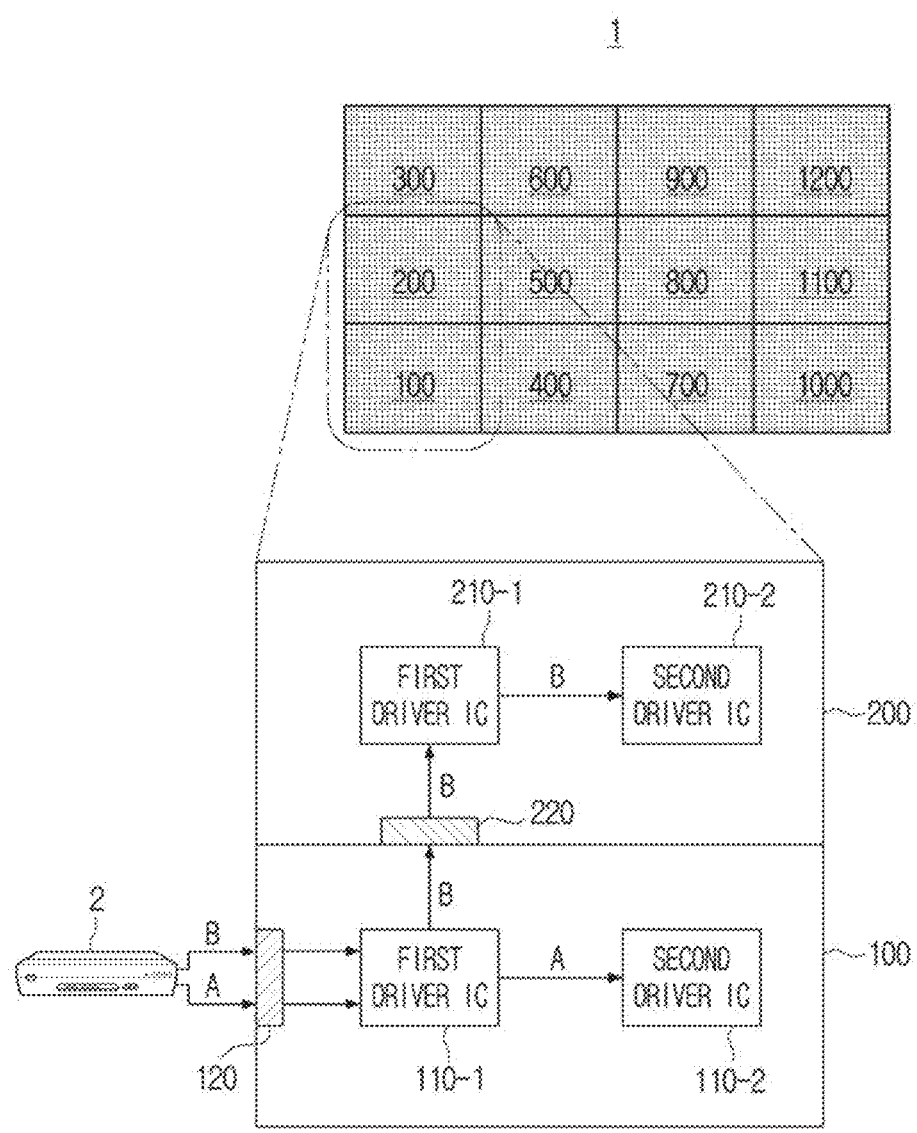
FIG. 4 is a diagram illustrating a display apparatus transmitting a signal to other display apparatuses according to one or more embodiments of the disclosure.

FIG. 4 is a diagram illustrating a display apparatus transmitting a signal to other display apparatus according to one or more embodiments of the disclosure.

Referring to FIG. 4, among a plurality of display apparatuses 100, 200, . . . , 1200 the first display apparatus 100 connected to the external device 2 (for example, a TCON provided in a control box of the modular display apparatus 1) may receive a first signal A and a second signal B from the external device 2.

The first signal A may be a driving signal (that is, a driving signal for driving a plurality of pixels included in the first display apparatus 100) corresponding to the first display apparatus 100, and the second signal B may be a driving signal (that is, a driving signal for driving a plurality of pixels included in the second display apparatus 200) corresponding to the second display apparatus 200.

For convenience of description, it is described that the first display apparatus 100 is connected to the second display apparatus 200 in a daisy chain manner, but the embodiment is not limited thereto. For example, the first display apparatus 100 may be serially connected to the second display apparatus 200, the second display apparatus 200 may be serially connected to the third display apparatus 300, and in this case, the first display apparatus 100 may receive a first signal A, a second signal B, and a third signal. The third signal may be a driving signal (that is, a driving signal to drive a plurality of pixels included in the second display apparatus 200) corresponding to the second display apparatus 200.

Referring to FIG. 4, the first display apparatus 100 according to an example may, when the first signal A and the second signal B are received from the external device 2 through the communication interface 120, transmit the first signal A and the second signal B to the first driver IC 110-1 among the plurality of driver ICs 110 included in the first display apparatus 100.

The first driver IC 110-1 may transmit a first signal to the remaining driver ICs 110-1, ..., 110-n connected in a daisy chain manner, and transmit a second signal B to the second display apparatus 200 serially connected to the first display apparatus 100.

When a second signal B is received through the communication interface 220 included in the second display apparatus 200, the second display apparatus 200 may transmit a second signal B to the first driver IC 210-1 of a plurality of driver ICs 210 included in the second display apparatus 200. Subsequently, the first driver IC 210-1 included in the second display apparatus 200 may transmit the second signal B to the remaining driver ICs 210-1, ..., 210-n connected in a daisy chain manner.

Figure 5:
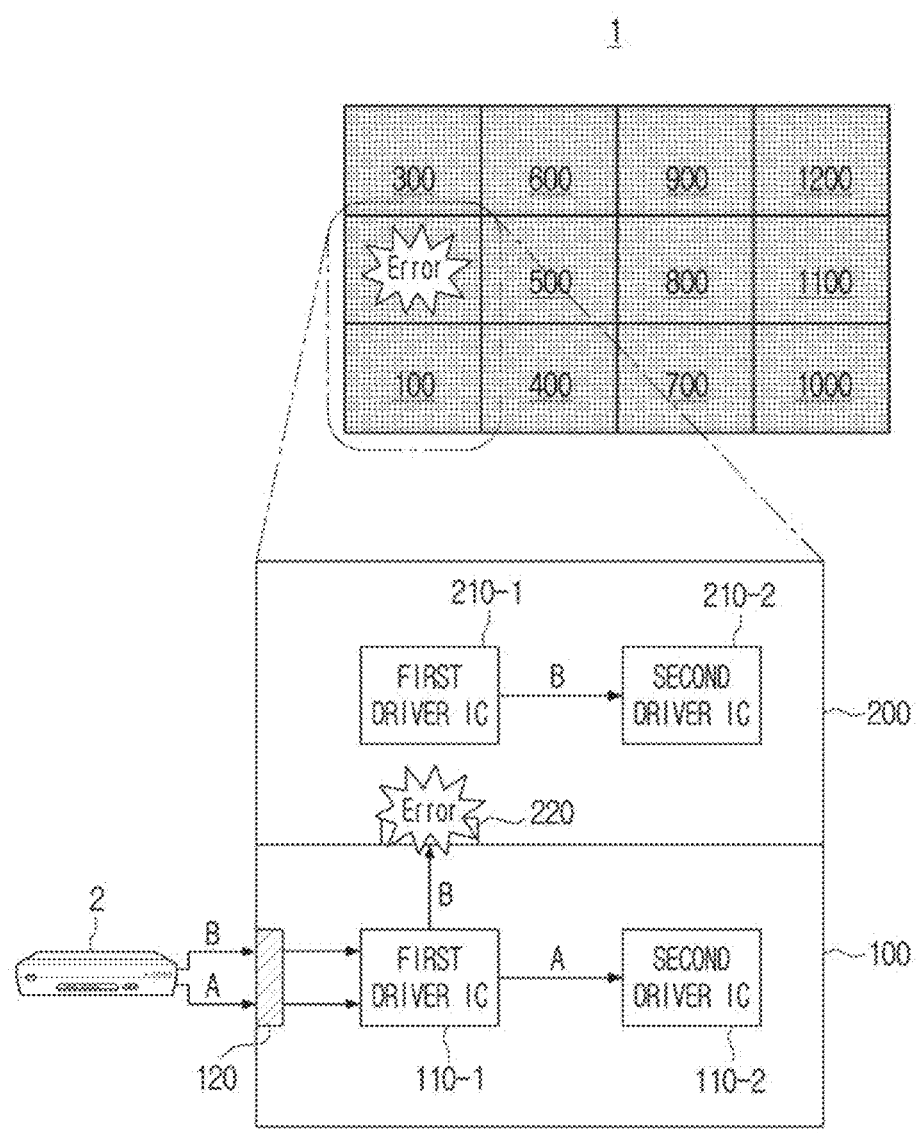
FIG. 5 is a diagram illustrating a display apparatus that may not transmit a signal as an error occurs between a display apparatus and the other display apparatuses according to one or more embodiments of the disclosure.

FIG. 5 is a diagram illustrating a display apparatus that may not transmit a signal as an error occurs between a display apparatus and the other display apparatus according to one or more embodiments of the disclosure.

Referring to FIG. 5, the first display apparatus 100, which is the first among the first display apparatus to the third display apparatus 100, 200, and 300 connected according to a daisy chain manner, may be connected to the external device 2 to receive a driving signal corresponding to the first display apparatus 100, a driving signal corresponding to the second display apparatus 200, and a driving signal corresponding to the third display apparatus 300 from the external device 2.

According to an embodiment, since the first display apparatus to the third display apparatus 100, 200, 300 are connected according to a daisy chain manner, the first display apparatus 100 may transmit a driving signal corresponding to the second display apparatus 200 and a driving signal corresponding to the third display apparatus 300 to the second display apparatus 200, and the second display apparatus 200 may transmit a driving signal corresponding to the third display apparatus 300 to the third display apparatus 300.

Since the first display apparatus to the third display apparatus 100, 200, 300 are continuously connected according to the daisy chain manner, when the connection between one section (for example, between the first display apparatus 100 and the second display apparatus 200) is disconnected or the transmission of the driving signal fails due to various causes such as an error, a plurality of display apparatuses (for example, the second display apparatus 200 to the third display apparatus 300) connected thereafter may not receive a driving signal.

In order to prevent the occurrence of such a problem, the first display apparatus 100 may provide a redundancy function for a driving signal corresponding to each of a plurality of display apparatuses (for example, the second display apparatus 200 to the third display apparatus 300) connected after using a plurality of driver ICs 110 included in the first display apparatus 100.

Figure 6:
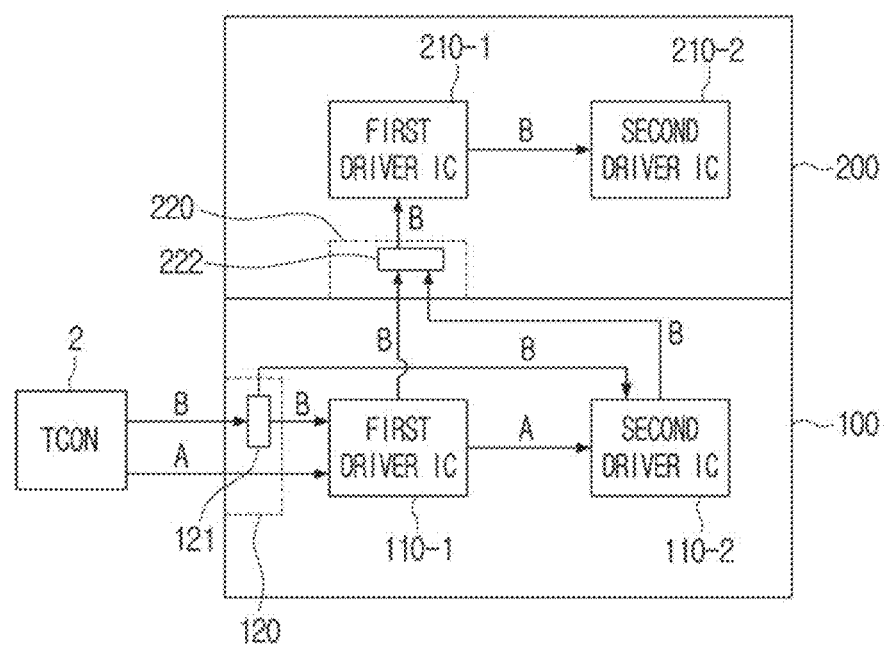
FIG. 6 is a diagram illustrating a display apparatus transmitting a signal to other display apparatuses according to one or more embodiments of the disclosure.

FIG. 6 is a diagram illustrating a display apparatus transmitting a signal to other display apparatuses according to one or more embodiments of the disclosure.

Hereinafter, the external device 2 is referred to as a TCON provided in the control box of the modular display apparatus 1, for convenience of description, but embodiments are not limited thereto.

Referring to FIG. 6, when a first signal A and a second signal B are received from a TCON 2 through the communication interface 120, the first display apparatus 100 may transmit a first signal A and a second signal B to the first driver IC 110-1 among a plurality of driver ICs 110 included in the first display apparatus 100.

The first driver IC 110-1 may transmit the first signal A to the second driver IC 110-2 so that the first signal A is sequentially transmitted to the remaining driver ICs 110-1, ..., 110-n connected in a daisy chain manner.

Each of the first driver IC 110-1 and the second driver IC 110-2 may transmit the second signal B to the second display apparatus 200 serially connected to the first display apparatus 100.

For example, the first driver IC 110-1 may transmit each of a first signal A and a second signal B to the second driver IC 110-2. Subsequently, the second driver IC 110-2 may transmit the first signal A to the driver IC (e.g., the third driver IC 110-3) connected to the second driver IC 110-2 according to a daisy chain manner. In addition, the second driver IC 110-2 may transmit the second signal B to the second display apparatus 200 serially connected to the first display apparatus 100.

As another example, the communication interface 120 of the first display apparatus 100 may include a repeater 121. The repeater 121 according to an example may, when the second signal B is received from the TCON 2, transmit the second signal B to each of the first driver IC 110-1 and the second driver IC 110-2, respectively. That is, the repeater 121 may transmit one second signal B received from the TCON 2 to each of two driver ICs (that is, the first driver IC 110-1 and the second driver IC 110-2).

When a second signal B is received through the communication interface 220 included in the second display apparatus 200, the second display apparatus 200 may transmit a second signal B to the first driver IC 210-1 of a plurality of driver ICs 210 included in the second display apparatus 200. Subsequently, the first driver IC 210-1 included in the second display apparatus 200 may transmit a second signal B to the remaining driver ICs 210-1, ..., 210-n connected in a daisy chain manner.

Each of the first driver IC 110-1 and the second driver IC 110-2 of the first display apparatus 100 transmits the second signal B to the second display apparatus 200, such that the communication interface 220 of the second display apparatus 200 may receive two second signals B.

The communication interface 220 of the second display apparatus 200 according to one embodiment of the disclosure may include the switch 222.

According to an embodiment, the switch 222 may, when the second signal B is received from each of the first driver IC 110-1 and the second driver IC 110-2 of the first display apparatus 100, transmit the second signal B received from the first driver IC 110-1 to the first driver IC 210-1 of the second display apparatus 200. Subsequently, the first driver IC 210-1 of the second display apparatus 200 may transmit the second signal B to the second driver IC 210-2 of the second display apparatus 200 so that the second signal B is sequentially transmitted to the remaining driver ICs 210-1, . . . , 210-n connected in a daisy chain manner.

In addition, when a second signal B is received from any one of the first driver IC 110-1 or the second driver IC 110-2 of the first display apparatus 100, the switch 222 may transmit a second signal B received from any one of the first driver IC 110-1 or the second driver IC 110-21 to the first driver IC 210-1 of the second display apparatus 200.

For example, when the second signal B is not received from the first driver IC 110-1 of the first display apparatus 100, and the second signal B is received from the second driver IC 110-2 of the first display apparatus 100, the switch 222 may transmit the second signal B received from the second driver IC 110-2 to the first driver IC 210-1 of the second display apparatus 200.

FIG. 6 illustrates that the first display apparatus 100 and the second display apparatus 200 are connected in a daisy chain manner and the first display apparatus 100 is connected to the TCON 2 provided in a control box to receive a driving signal from the TCON 2, but this is merely an example and is not limited thereto.

In the various embodiments, the first display apparatus 100 and the third display apparatus 300 may be connected by a daisy chain manner, and may also be implemented by the second display apparatus 200 that receives a driving signal from the first display apparatus 100 and transmits a driving signal to the third display apparatus 300.

Figure 7:
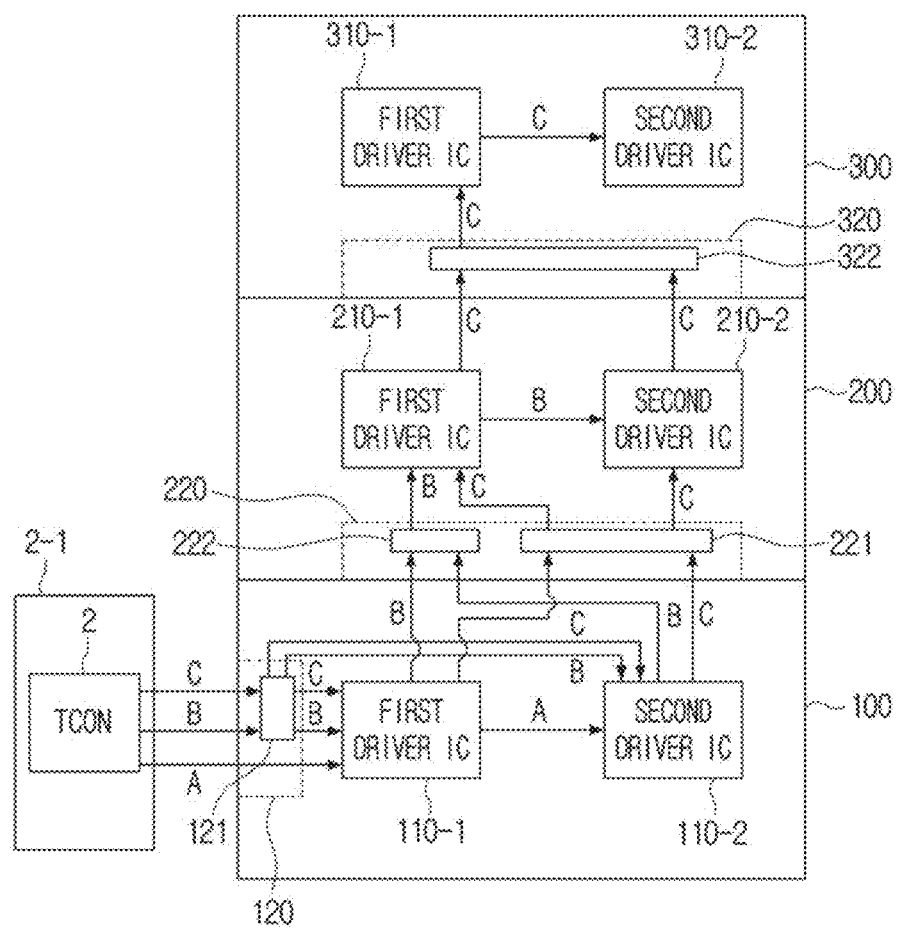
FIG. 7 is a diagram illustrating a display apparatus that receives a signal from first display apparatuses and transmits a signal to second display apparatuses according to one or more embodiments of the disclosure.

FIG. 7 is a diagram illustrating a display apparatus that receives a signal from first other display apparatuses and transmits a signal to second other display apparatuses according to one or more embodiments of the disclosure.

FIG. 7 is a diagram illustrating an example in which a TCON 2 provided in a control box 2-1 of a modular display apparatus 1 transmits a driving signal corresponding to the first display apparatus 100, a driving signal corresponding to the second display apparatus 200, and a driving signal corresponding to the third display apparatus 300 to the first display apparatus 100 included in a first group (including first to third display apparatuses 100, 200, 300), and each of the first display apparatus 100 to the third display apparatus 300 provides a redundancy function.

The control box 2-1 may, based on identification information corresponding to each of the display apparatuses included in each of the plurality of groups, identify regions corresponding to each of a plurality of groups among the entire regions of the image and a connection order among the display apparatuses included in each of the plurality of groups.

For example, the control box 2-1 may divide a plurality of display apparatuses 100, 200, . . . , 1200 included in the modular display apparatus 1 into a plurality of groups, the first group may include the first to third display apparatuses 100, 200, 300 based on each identification information (e.g., ID1, ID2, ID3) of each of first to third display apparatuses 100, 200, 300 included in the first group among a plurality of groups, and the connection order of the first display apparatus 100→second display apparatus 200→third display apparatus 300 may be identified. In addition, the control box 2-1 may identify an area corresponding to the first group among the entire area of the image corresponding to the video signal, one area corresponding to the first display apparatus 100 among the areas corresponding to the first group, one area corresponding to the second display apparatus 200, and one area corresponding to the third display apparatus 300.

The control box 2-1 may obtain a driving signal (hereinafter, a first signal A) corresponding to the first display apparatus 100, a driving signal (hereinafter, a second signal B) corresponding to the second display apparatus 200, and a driving signal (hereinafter, a third signal C) corresponding to the third display apparatus 300 based on a connection sequence between the first to third display apparatuses 100, 200, 300 and one region corresponding to each of the first to third display apparatuses 100, 200, 300.

The TCON 2 included in the control box 2-1 may transmit the first signal A, the second signal B, and the third signal C to the first display apparatus 100.

According to an embodiment, the first display apparatus 100 may transmit a first signal A to the first driver IC 110-1 of a plurality of driver ICs 110 included in the first display apparatus 100 when a first signal A, a second signal B, and a third signal C are received from the TCON 2 through the communication interface 120. The first driver IC 110-1 may transmit the first signal A to the second driver IC 110-2 such that the first signal A is sequentially transmitted to the remaining driver ICs 110-1, . . . , 110-n connected by a daisy chain manner.

The repeater 121 included in the communication interface 120 of the first display apparatus 100 may, when receiving, from the TCON 2, the second signal B and the third signal C (that is, remaining driving signals (e.g., second signal B and third signal C) excluding the driving signal (e.g., first signal A) corresponding to the first display apparatus 100), transmit the second signal B and the third signal C to each of the first driver IC 110-1 and the second driver IC 110-2. That is, the repeater 121 may transmit each of one second signal B and one third signal C received from the TCON 2 to each of the two driver ICs (that is, the first driver IC 110-1 and the second driver IC 110-2).

The first driver IC 110-1 may then transmit a second signal B and a third signal C to the second display apparatus 200. In addition, the second driver IC 110-2 may also transmit the second signal B and the third signal C to the second display apparatus 200.

After the switch 222 included in the communication interface 220 of the second display apparatus 200 is received from the first driver IC 110-1 of the first display apparatus 100, the switch 222 included in the communication interface 220 of the second display apparatus 200 may transmit the second signal B to the first driver IC 210-1 of the second display apparatus 200. The first driver IC 210-1 may transmit the second signal B to the second driver IC 210-2 such that the second signal B is sequentially transmitted to the remaining driver ICs 210-1, . . . , 210-n connected by a daisy chain manner.

The switch 222 included in the communication interface 220 of the second display apparatus 200 may transmit a second signal B to the first driver IC 210-1 of the second display apparatus 200 when the second signal B is not received from the first driver IC 110-1 of the first display apparatus 100 and the second signal B is received from the second driver IC 110-2 of the first display apparatus 100.

The first driver IC 210-1 may transmit the second signal B to the second driver IC 210-2 such that the second signal B is sequentially transmitted to the remaining driver ICs 210-1, . . . , 210-$n$ connected by a daisy chain manner.

The repeater 221 included in the communication interface 220 of the second display apparatus 200 may, when the third signal C is received from at least one of the first driver IC 110-1 of the first display apparatus 100 or the second driver IC 110-2 of the first display apparatus 100, transmit the third signal C to each of the first driver IC 210-1 and the second driver IC 210-2. That is, the repeater 221 may transmit, to two driver ICs (that is, the first driver IC 210-1 and the second driver IC 210-2), at least one third signal B received from the first display apparatus 100.

The first driver IC 210-1 may transmit the third signal C to the third display apparatus 200. The second driver IC 210-2 may transmit the third signal C to the third display apparatus 300.

The switch 322 included in the communication interface 320 of the third display apparatus 300 may, when the third signal C is received from the second driver IC 210-1 of the second display apparatus 200, transmit the third signal C to the first driver IC 310-1 of the third display apparatus 300. The first driver IC 310-1 may transmit the third signal C to the second driver IC 310-2 so that the third signal C is sequentially transmitted to other driver ICs 310-1, . . . , 310-$n$ connected by the daisy chain manner.

The switch 322 included in the communication interface 320 of the third display apparatus 300 may, when the third signal C is not received from the first driver IC 210-1 of the second display apparatus 200 and the third signal C is received from the second driver IC 210-2 of the second display apparatus 200, transmit the third signal C to the first driver IC 310-1 of the third display apparatus 300. The first driver IC 310-1 may transmit the third signal C to the second driver IC 310-2 so that the third signal C is sequentially transmitted to the remaining driver ICs 310-1, . . . , 310-$n$ connected by a daisy chain manner.

Even if connection is released in one section (e.g., between the first driver IC 210-1 of the second display apparatus 200 and the third display apparatus 300) or transmission of a driving signal fails due to various causes such as error, transmission of a driving signal is successful through remaining one section (e.g., between the second driver IC 210-2 of the second display apparatus 200 and the third display apparatus 300), the third display apparatus 300 may receive a driving signal.

Figure 8:
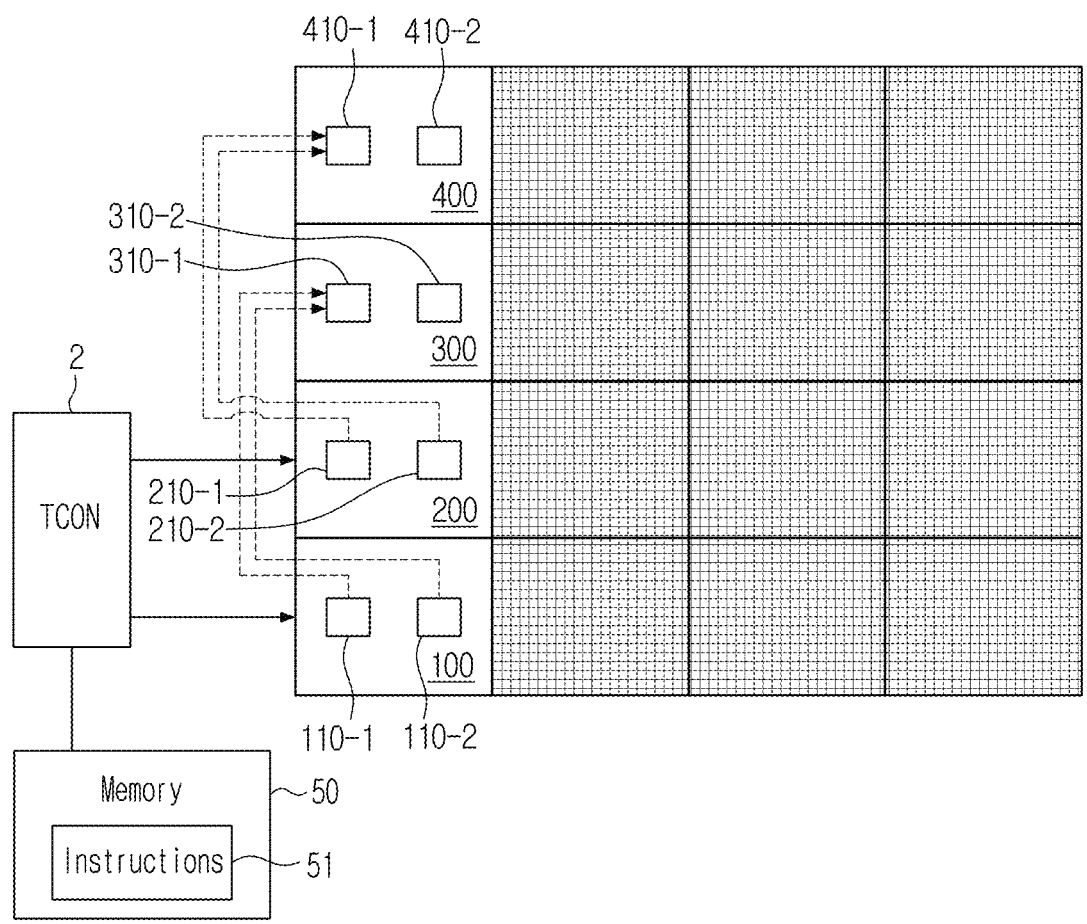
FIG. 8 is a diagram illustrating a display apparatus transmitting a signal to other display apparatuses according to one or more embodiments of the disclosure.

FIG. 8 is a diagram illustrating a display apparatus transmitting a signal to other display apparatuses according to one or more embodiments of the disclosure.

In the above-described example, it is assumed that a display apparatus (for example, the second display apparatus 200) receives a driving signal from an adjacent first other display apparatus (for example, the first display apparatus 100) and transmits a driving signal to an adjacent second other display apparatus (for example, the third display apparatus 300), but this is merely an example and is not limited thereto.

For example, the display apparatus (e.g., the first display apparatus 100) may receive a driving signal from the external device 200, but may transmit a driving signal to another display apparatus (e.g., the third display apparatus 300) connected in series, but that is not adjacent.

For example, the first display apparatus 100 may receive a driving signal corresponding to the first display apparatus 100 and a driving signal corresponding to the third display apparatus 300 from the external device 2, and each of the first driver IC 110-1 and the second driver IC 110-2 provided in the first display apparatus 100 may transmit a driving signal corresponding to the third display apparatus 300 to the third display apparatus 300.

For example, the first display apparatus 100 may receive a driving signal corresponding to the first display apparatus 100 and a driving signal corresponding to the third display apparatus 300 from the external device 2, and each of the first driver IC 110-1 and the second driver IC 110-2 provided in the first display apparatus 100 may transmit a driving signal corresponding to the third display apparatus 300 to the third display apparatus 300.

However, this is merely an example, and the embodiment is not limited thereto. For example, all the plurality of display apparatuses 100, 200, . . . , 1200, are connected according to a daisy chain manner and the first display apparatus 100 which is the first among a plurality of display apparatuses 100, 200, . . . , 1200 connected according to the daisy chain manner may be connected to the external device 2 (e.g., control box). In addition, the first display apparatus 100 may receive all the driving signals corresponding to each of the plurality of display apparatuses 100, 200, . . . , 1200 from the external device 2.

n number of display apparatuses are connected in a daisy chain manner, and when the first display apparatus receives a driving signal corresponding to each of the first to $n^{th}$ display apparatuses, the first display apparatus may provide a redundancy function for a driving signal corresponding to each of the second to $n^{th}$ display apparatuses connected after using a plurality of driver ICs included in the first display apparatus.

The $n-1^{th}$ display apparatus may provide a redundancy function for a driving signal corresponding to an $n^{th}$ display apparatus connected thereafter by using a plurality of driver ICs included in the n–$1^{th}$ display apparatus.

In the above example, the control box (e.g., the control box 2-1 of FIG. 7) includes one or more processors, and controls overall operations of the modular display apparatus 1.

According to one or more embodiments, the processor may be implemented with at least one of a digital signal processor (DSP), a microprocessor, and a TCON. The processor is not limited thereto and may include at least one or more of a central processing unit (CPU), a micro controller unit (MCU), a micro processing unit (MPU), a controller, an AP, a communication processor (CP), an advanced reduced instruction set computing (RISC) machine (ARM) processor, and an artificial intelligence (AI) processor or may be defined as a corresponding term. The processor may be implemented in a system on chip (SoC) type or a large scale integration (LSI) type in which a processing algorithm is built therein or in a field programmable gate array (FPGA) type. The processor may perform various functions by executing computer executable instructions stored in a memory.

One or more processors may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors may control one or any combination of other components of the electronic apparatus and may perform operations or data processing relating to the communication. The one or more processors may execute one or more programs or instructions stored in the memory. For example, one or more processors may perform a method in accordance with one or more embodiments of the disclosure by executing one or more instructions stored in a memory.

When a method according to one or more embodiments of the disclosure includes a plurality of operations, a plurality of operations may be performed by one processor or may be performed by a plurality of processors. For example, when a first operation, a second operation, and a third operation are performed by a method according to one or more embodiments, all of the first operation, the second operation, and the third operation may be performed by the first processor, the first operation and the second operation may be performed by a first processor (e.g., a general purpose processor), and the third operation may be performed by a second processor (e.g., an artificial intelligence dedicated processor).

The one or more processors may be implemented as a single core processor including one core, or may be implemented as one or more multicore processors including a plurality of cores (for example, homogeneous multi-cores or heterogeneous multi-cores). When the one or more processors are implemented as a multi-core processor, each of the plurality of cores included in the multi-core processor may include a processor internal memory such as a cache memory and an on-chip memory, and a common cache shared by the plurality of cores may be included in the multi-core processor. In addition, each of a plurality of cores (or a part of a plurality of cores) included in the multi-core processor may independently read and perform a program command for implementing a method according to one or more embodiments of the disclosure, and may read and perform a program command for implementing a method according to one or more embodiments of the disclosure in connection with all (or a part of) a plurality of cores.

When the method according to one or more embodiments of the disclosure includes a plurality of operations, the plurality of operations may be performed by one core among a plurality of cores included in the multi-core processor or may be performed by the plurality of cores. For example, when a first operation, a second operation, and a third operation are performed by a method according to one or more embodiments, all the first operation, second operation, and third operation may be performed by a first core included in the multi-core processor, and the first operation and the second operation may be performed by a first core included in the multi-core processor and the third operation may be performed by a second core included in the multi-core processor.

In the embodiments of the disclosure, the processor may refer to a system-on-chip (SoC), a single core processor, a multi-core processor, or a core included in a single core processor or a multi-core processor in which one or more processors and other electronic components are integrated, where the core may be implemented as a CPU, a GPU, an APU, a MIC, a DSP, an NPU, a hardware accelerator, or a machine learning accelerator, but embodiments of the disclosure are not limited thereto.

The modular display apparatus 1 according to an embodiment of the disclosure may further include a memory 50. The memory 50 may be a non-transitory, computer-readable storage medium configured to store instructions 51 that, when executed by a processor, such as a TCON 2, cause the processor to perform various functions described herein.

According to one or more embodiments, a memory may store data necessary for various embodiments of the disclosure. According to one or more embodiments, the memory may be implemented as a memory embedded within the modular display apparatus 1 or a memory detachable from the modular display apparatus 1 according to the usage of data storage.

For example, the data for driving the modular display apparatus 1 may be stored in the memory embedded within the modular display apparatus 1, and the data for upscaling of the modular display apparatus 1 may be stored in the memory detachable from the modular display apparatus 1. The memory embedded in the modular display apparatus 1 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the modular display apparatus 1, the memory may be implemented as a memory card, such as a compact flash (CF), secure digital (SD), micro secure digital (micro-SD), mini secure digital (mini-SD), extreme digital (xD), or multi-media card (MMC), and an external memory, such as a USB memory connectable to the USB port.

According to an embodiment, the memory may store at least one instruction for controlling the modular display apparatus 1 or a computer program including instructions.

In particular, the memory may include identification corresponding to each of a plurality of display apparatuses 100, 200, . . . , 1200 included in the modular display apparatus 1.

Each of the plurality of display apparatuses 100, 200, . . . , 1200 includes a display, and the display may be implemented as a display including a self-emitting element or a display including a non-self-limiting element and a backlight.

For example, the display may be implemented as a display of various types such as, for example, and without limitation, a liquid crystal display (LCD), organic light emitting diodes (OLED) display, LED, micro LED, mini LED, plasma display panel (PDP), quantum dot (QD) display, quantum dot light-emitting diodes (QLED), or the like. In the display 130, a backlight unit, a driving circuit which may be implemented as an a-si thin film transistor (TFT), low temperature poly silicon (LTPS) TFT, organic TFT (OTFT), or the like, may be included as well. The display may be implemented as a touch screen coupled to a touch sensor, a flexible display, a rollable display, a third-dimensional (3D) display, a display in which a plurality of display modules are physically connected, or the like.

Figure 9:
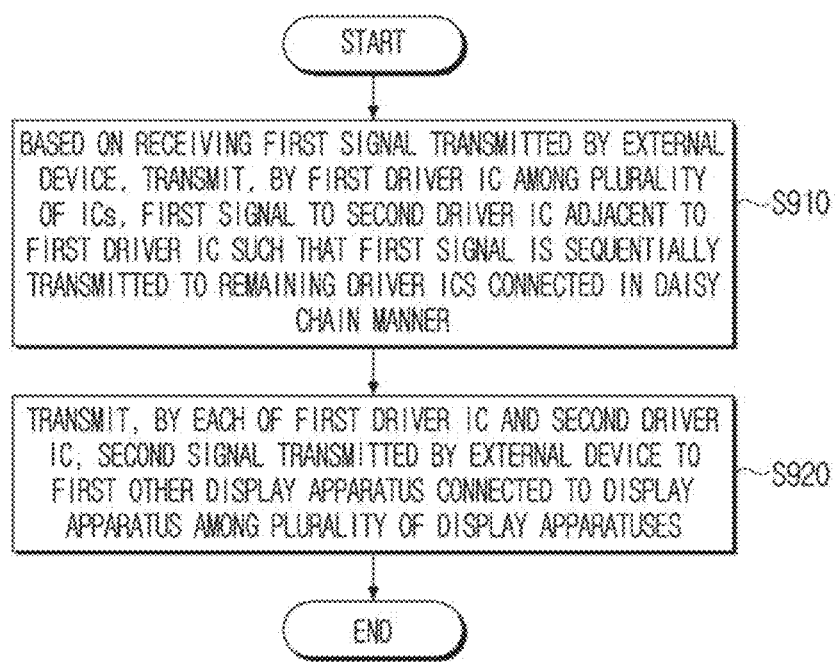
FIG. 9 is a diagram illustrating a method of controlling a display apparatus according to one or more embodiments of the disclosure.

FIG. 9 is a diagram illustrating a method of controlling a display apparatus according to one or more embodiments of the disclosure.

A method of controlling a display apparatus included in a modular display apparatus composed of a plurality of display apparatuses may include, based on receiving a first signal transmitted by an external device, transmitting the first signal to a second driver IC adjacent to the first driver IC such that the first signal is sequentially transmitted to remaining driver ICs connected in a daisy chain manner in operation S910.

The method may include transmitting, by each of the first driver IC and the second driver IC, the second signal transmitted by the external device to a first other display apparatus connected to the display apparatus among the plurality of display apparatuses in operation S920.

The first signal may be a driving signal corresponding to the display apparatus, and the second signal may be a driving signal corresponding to the first other display apparatus.

The transmitting to the first other display apparatus in operation S920 according to one or more embodiments may include transmitting, by the first driver IC, the second signal to the second driver IC and transmitting, by the second driver IC, the second signal to the first other display apparatus.

The transmitting to the first other display apparatus in operation S920 according to one or more embodiments may include receiving, by a repeater, the second signal transmitted by the external device and transmitting the second signal to each of the first driver IC and the second driver IC.

The transmitting to the first other display apparatus in operation S920 may include, based on receiving the second signal through the repeater, transmitting, by the second driver IC, the second signal to the first other display apparatus.

The external device may be a control box or any one of second other display apparatuses connected to the display apparatus among the plurality of display apparatuses.

The method may further include, based on the external device being the second other display apparatus, identifying whether the first signal is received from each of a first driver IC and a second driver IC among a plurality of driver ICs included in the second other display apparatus, by a switch.

The method may further include, based on receiving the first signal from the first driver IC included in the second other display apparatus, transmitting the first signal to the first driver IC included in the display apparatus, and based on not receiving the first signal from the first driver IC included in the second other display apparatus, transmitting the first signal received from the second driver IC included in the second other display apparatus to the first driver IC included in the display apparatus.

The display apparatus and the first other display apparatus according to one or more embodiments may be connected by a daisy chain manner, and the first other display apparatus may be adjacent to the display apparatus.

The various embodiments of the disclosure may be applied not only to an electronic apparatus but to also various types of electronic apparatuses including a display.

In addition, one or more embodiments described above may be implemented in a computer readable medium, such as a computer or similar device, using software, hardware, or combination thereof. In some cases, the one or more embodiments described herein may be implemented by the processor itself. According to a software implementation, embodiments such as the procedures and functions described herein may be implemented with separate software modules. Each of the software modules may perform one or more of the functions and operations described herein.

According to the embodiments, computer instructions for performing the processing operations of the apparatus may be stored in a non-transitory computer-readable medium. The computer instructions stored in the non-transitory computer-readable medium may cause a particular apparatus to perform the processing operations on the electronic apparatus 100 according to the one or more embodiments described above when executed by the processor of the particular apparatus.

The non-transitory computer readable medium may include a medium that stores data semi-permanently rather than storing data for a very short time, such as a register, a cache, a memory, etc., and is readable by an apparatus. For example, the aforementioned various applications or programs may be stored in the non-transitory computer readable medium, for example, a compact disc (CD), a digital versatile disc (DVD), a hard disc, a Blu-ray disc, a USB, a memory card, a ROM, and the like, and may be provided.

While one or more embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method of controlling a display apparatus of a modular display apparatus comprising a plurality of display apparatuses, the display apparatus comprising a plurality of driver integrated circuits (ICs), the method comprising:
based on receiving a first signal transmitted by an external device, transmitting the first signal to a second driver IC among the plurality of driver ICs that is adjacent to a first driver IC among the plurality of driver ICs, such that the first signal is sequentially transmitted to remaining driver ICs of the plurality of driver ICs that are connected in a daisy chain manner; and
transmitting, by each of the first driver IC and the second driver IC, a second signal, that is transmitted by the external device, to a first other display apparatus among the plurality of display apparatuses that is connected to the display apparatus.

2. The method of claim 1, wherein the first signal comprises a first driving signal corresponding to the display apparatus, and wherein the second signal comprises a second driving signal corresponding to the first other display apparatus.

3. The method of claim 1, wherein the transmitting the second signal to the first other display apparatus comprises:
transmitting, by the first driver IC, the second signal to the second driver IC; and
transmitting, by the second driver IC, the second signal to the first other display apparatus.

4. The method of claim 1, wherein the transmitting the second signal to the first other display apparatus comprises:
receiving, by a repeater, the second signal that is transmitted by the external device; and
transmitting the second signal to each of the first driver IC and the second driver IC.

5. The method of claim 4, wherein the transmitting the second signal to the first other display apparatus further comprises:
based on receiving the second signal through the repeater, transmitting, by the second driver IC, the second signal to the first other display apparatus.

6. The method of claim 1, wherein the external device comprises a control box or a second other display apparatuses among the plurality of display apparatuses that is connected to the display apparatus.

7. A non-transitory computer-readable storage medium storing instructions that, when executed by at least one processor, cause the at least one processor to, in a display apparatus of a modular display apparatus comprising a plurality of display apparatuses:
based on receiving a first signal transmitted by an external device, transmitting the first signal to a second driver integrated circuit (IC) among a plurality of driver ICs within the display apparatus that is adjacent to a first driver IC among the plurality of driver ICs, such that the first signal is sequentially transmitted to remaining driver ICs of the plurality of driver ICs that are connected in a daisy chain manner; and transmitting, by each of the first driver IC and the second driver IC, a second signal, that is transmitted by the external device, to a first other display apparatus among the plurality of display apparatuses that is connected to the display apparatus.

8. The storage medium of claim 7, wherein the first signal comprises a driving signal corresponding to the display apparatus, and wherein the second signal comprises a driving signal corresponding to the first other display apparatus.

9. The storage medium of claim 7, wherein the instructions, when executed, further cause the at least one processor to:

transmit, by the first driver IC, the second signal to the second driver IC; and transmit, by the second driver IC, the second signal to the first other display apparatus.

10. The storage medium of claim 7, wherein the instructions, when executed, further cause the at least one processor to:

receive, by a repeater, the second signal that is transmitted by the external device; and transmit the second signal to each of the first driver IC and the second driver IC.

11. The storage medium of claim 10, wherein the instructions, when executed, further cause the at least one processor to:

based on receiving the second signal through the repeater, transmit, by the second driver IC, the second signal to the first other display apparatus.

12. A display apparatus of a modular display apparatus comprising a plurality of display apparatuses, the display apparatus comprising:

a communication interface; and a plurality of driver integrated circuits (ICs), wherein a first driver IC among the plurality of driver ICs is configured to:

based on receiving a first signal transmitted by an external device through the communication interface, transmit the first signal to a second driver IC adjacent to the first driver IC such that the first signal is sequentially transmitted to remaining driver ICs among the plurality of driver ICs that are connected in a daisy chain manner, and wherein each of the first driver IC and the second driver IC is configured to transmit a second signal, that is transmitted by the external device, to a first other display apparatus among the plurality of display apparatuses that is connected to the display apparatus.

13. The display apparatus of claim 12, wherein the first signal comprises a first driving signal corresponding to the display apparatus, and wherein the second signal comprises a second driving signal corresponding to the first other display apparatus.

14. The display apparatus of claim 12, wherein the first driver IC is configured to, based on receiving the second signal through the communication interface, transmit the second signal to the second driver IC, and wherein the second driver IC is configured to, based on receiving the second signal from the first driver IC, transmit the second signal to the first other display apparatus.

15. The display apparatus of claim 12, wherein the communication interface comprises a repeater configured to:

receive the second signal transmitted by the external device; and transmit the second signal to each of the first driver IC and the second driver IC.

16. The display apparatus of claim 15, wherein the second driver IC is further configured to, based on receiving the second signal through the repeater of the communication interface, transmit the second signal to the first other display apparatus.

17. The display apparatus of claim 12, wherein the external device comprises a control box or a second other display apparatus among the plurality of display apparatuses that is connected to the display apparatus.

18. The display apparatus of claim 17, wherein the communication interface comprises a switch, and wherein the switch is configured to, based on the external device being the second other display apparatus, identify whether the first signal is received from each of a third driver IC and a fourth driver IC of the second other display apparatus.

19. The display apparatus of claim 18, wherein the switch is further configured to:

based on receiving the first signal from the third driver IC of the second other display apparatus, transmit the first signal to the first driver IC of the display apparatus, and based on not receiving the first signal from the third driver IC of the second other display apparatus, transmit the first signal received from the fourth driver IC of the second other display apparatus to the first driver IC of the display apparatus.

20. The display apparatus of claim 12, wherein the display apparatus and the first other display apparatus are connected in a daisy chain manner, and wherein the first other display apparatus is adjacent to the display apparatus.

\* \* \* \* \*